United States Patent
Bucher

[19]

[11] Patent Number: 6,076,231
[45] Date of Patent: Jun. 20, 2000

[54] NOZZLE FOR A LAWN AND GARDEN BLOWER

[76] Inventor: Charles Bucher, 2114 Golf Manor Blvd., Valrico, Fla. 33594

[21] Appl. No.: 09/143,043

[22] Filed: Aug. 28, 1998

[51] Int. Cl.[7] .................................. A47L 5/24; A47L 9/02
[52] U.S. Cl. .............................. 15/405; 15/415.1; 15/416
[58] Field of Search .................................. 15/405, 415.1, 15/416

[56] References Cited

U.S. PATENT DOCUMENTS

| | | | |
|---|---|---|---|
| 4,644,606 | 2/1987 | Luerken et al. | 15/330 |
| 5,652,995 | 8/1997 | Henke et al. | 15/344 |
| 5,722,111 | 3/1998 | Sowell et al. | 15/405 |

*Primary Examiner*—Theresa T. Snider
*Attorney, Agent, or Firm*—Brian S. Steinberger; Law Offices of Brian S. Steinberger

[57] ABSTRACT

An output nozzle for allowing plural air flow passage channels in different directions from a gas/electric yard/lawn air blower. The blower uses nozzles having a primary airstream for blowing debris such as leaves, dirt and trash upward above an obstacle such as grass and curbs and a second airstream for propelling debris outward over the obstacle. One version uses a second smaller nozzle upwardly angled at a slight angle of approximately 45 degrees from the upper surface of the main exhaust nozzle. Another version uses a flapper shut off valve in the second nozzle for selectively opening and closing the second nozzle. A still another version uses an extension member having a swivel base for allowing the second airflow exhaust to be directed into different angled directions therefrom. A still another version has a slidable second nozzle having one position closing off airflow, and a second position where airflow passes out from the second nozzle. A still another version has the second nozzle positioned slightly above and behind the first nozzle. An a still another version has three nozzles the bottom having the largest opening, followed by the middle followed by the top with each opening positioned above and slightly behind the nozzle opening below.

18 Claims, 6 Drawing Sheets

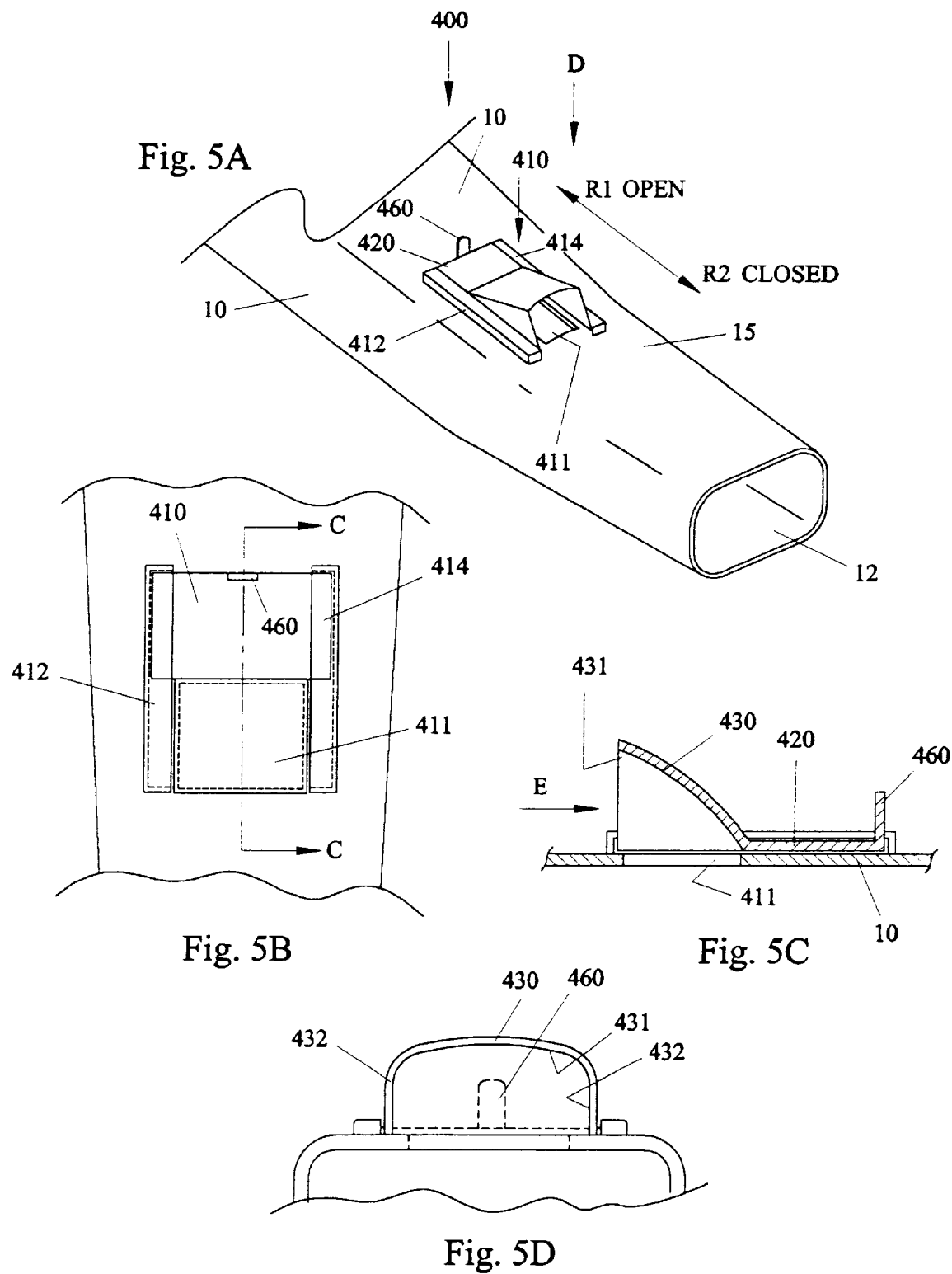

NOZZLE FOR A LAWN AND GARDEN BLOWER

This invention relates to gas and electric powered lawn and garden blowers, and in particular to a dual outlet nozzle for a blower for directing airflow to allow debris such as leaves, grass, dirt and trash to be moved upward and over obstacles such as lawn edges and curbs.

BACKGROUND AND PRIOR ART

Gasoline and electric powered lawn and garden blowers have become very popular in the recent years for moving and cleaning loose debris from lawns, gardens, sidewalks, driveways and other paved areas. Blowers are now used commercially and domestically for eliminating grass clippings, leaves, dirt, and trash debris from most outdoor surfaces. Generally, the structure of the powered blower includes a tubular exhaust nozzle which is well known and has not dramatically changed in recent years. The tubular nozzle directs pressurized air in one direction which the user usually directs in a downward direction at the debris moving the debris along.

A serious problem with current blowers occurs when the blower nozzle is directed at an obstacle that is higher than the surface being cleaned, such as grass along a sidewalk or a curb along the street. Under these normal operating conditions, an undesirable turbulence forms which causes the debris to blow back towards the user. Furthermore, these turbulence conditions can make it impossible to blow the debris over the obstacle because the debris keep blowing backwards. Having to stop using the blower and physically pick up the debris would defeat the purpose of using the powered blowers. Thus, with obstacles, the user of the blower can be faced with having to direct the debris elsewhere to a distant location for removal.

SUMMARY OF THE INVENTION

The first objective of the present invention is to provide a lawn and garden powered blower with outlet nozzles having a primary airstream for blowing debris upward above an obstacle and a second airstream for propelling debris outward over the obstacle.

The second object of the present invention is to provide a lawn and garden powered blower with outlet nozzles having a primary airstream nozzle for blowing debris upward above an obstacle and an additional second nozzle that can be opened and closed to direct a second airstream for propelling debris outward over the obstacle.

The third object of the present invention is to provide a lawn and garden powered blower having a dual outlet nozzle with a primary airstream nozzle for blowing debris upward above an obstacle and an additional second nozzle that can be adjustably angled to direct a second airstream for propelling debris outward over the obstacle.

The fourth object of the present invention is to provide a lawn and garden powered blower having a dual outlet nozzle with a primary airstream nozzle for blowing debris upward above an obstacle and an additional slidable nozzle that is selectively used to direct a second airstream for propelling debris outward over the obstacle.

The fifth object of this invention is to provide a lawn and garden powered blower having an outlet nozzle with directional baffles so that one airstream blows debris upward above an obstacle and a second airstream propels debris outward over the obstacle.

A preferred embodiment of the nozzle invention includes the combination of a gas or electric motor for moving an airflow, a first longitudinal nozzle having an exhaust end for passing a first portion of the airflow in a first direction outside the exhaust end, and a second nozzle attached to the first nozzle having a second exhaust end for passing a second portion of the airflow in a second direction outside the second exhaust end, the first direction being different from the second direction, wherein combining the first portion and the second portion of the airflow causes debris to move upward and over an obstruction in the flow path of the first longitudinal nozzle. The second nozzle can have a slightly upwardly angled housing of approximately 45 degrees to the first longitudinal nozzle.

A second embodiment of the nozzle invention can include a shut-off valve having a first position for allowing air to pass through the second nozzle and a second position for closing airflow through the second nozzle.

A third embodiment of the nozzle invention can include an extension member connected to the second exhaust end of the second nozzle, the extension member being movable so that airflow from the second nozzle can pass in plural directions therefrom.

A fourth embodiment of the nozzle invention can include a sliding member having a first position for allowing air to pass through the second nozzle and a second position for closing airflow through the second nozzle.

A fifth embodiment of the nozzle invention includes a second nozzle above and slightly behind the main nozzle.

A sixth embodiment of the nozzle invention includes a third nozzle above a second nozzle which is above the main nozzle.

The novel nozzles form a swirling airflow from pressurized air within the powered blower so that debris in front of the nozzles are moved around an obstacle, such as a curb, and the like, located behind the debris.

Further objects and advantages of this invention will be apparent from the following detailed description of a presently preferred embodiment which is illustrated schematically in the accompanying drawings.

BRIEF DESCRIPTION OF THE FIGURES

FIG. 5A is a perspective view of a fourth embodiment with a slidable second nozzle.

FIG. 5B is a top view of FIG. 5A along arrow D.

FIG. 5C is a cross-sectional side view of the slidable second nozzle of FIG. 5B along arrow C.

FIG. 5D is a front view of the nozzle portion of FIG. 5C along arrow E.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
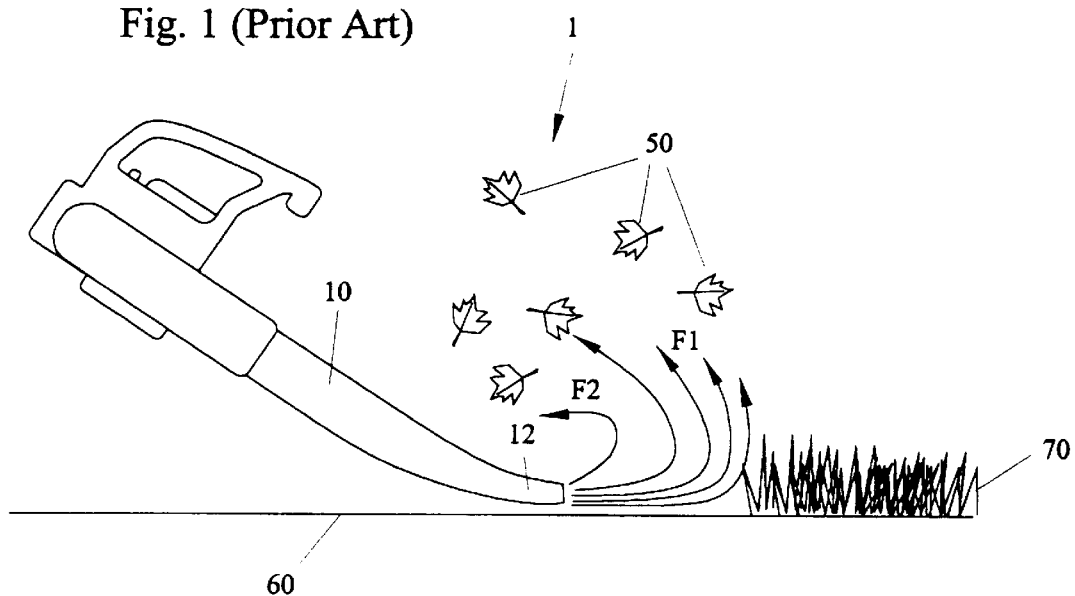
FIG. 1 is a side view of a prior art lawn and garden powered blower.

FIG. 1 is a side view 1 of a prior art lawn and garden powered blower with a nozzle portion 10 having an exhaust end opening 12. Examples of conventional powered blower can be like those shown in U.S. Pat. Nos. 4,644,606 and 5,652,995, which are incorporated by reference. Referring to FIG. 1, exhaust end 12 of nozzle 10 when used over the ground surface 60 blows pressurized air that when striking an obstruction 70 such as grass/curbs and the like causes the airflow to move in the direction of arrow F1 upwards and in a turbulent fashion backwards to the blower in the direction of arrow F2. Thus, debris 50 such as leaves, dirt, grass, and the like, can reflect backward to the blower 1 as explained in the background section of this invention.

Figure 2A:
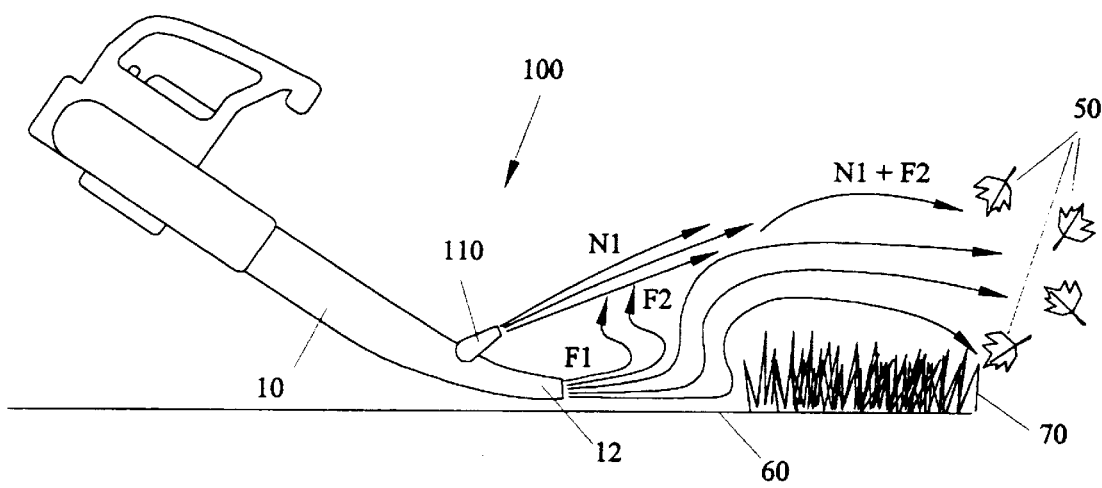
FIG. 2A is a side view of a first embodiment of the novel blower of FIG. 1 with a second upwardly angled novel nozzle.

FIG. 2A is a side view of a first embodiment of the nozzle portion 100 of the novel blower of FIG. 1 with a second upwardly angled tubular nozzle 110. The slightly upwardly angled second nozzle 110 directs a second stream in the direction of arrow N1, so that the combined airflow (N1+F2) moves the debris 50' over the obstacle 70.

Figure 2B:
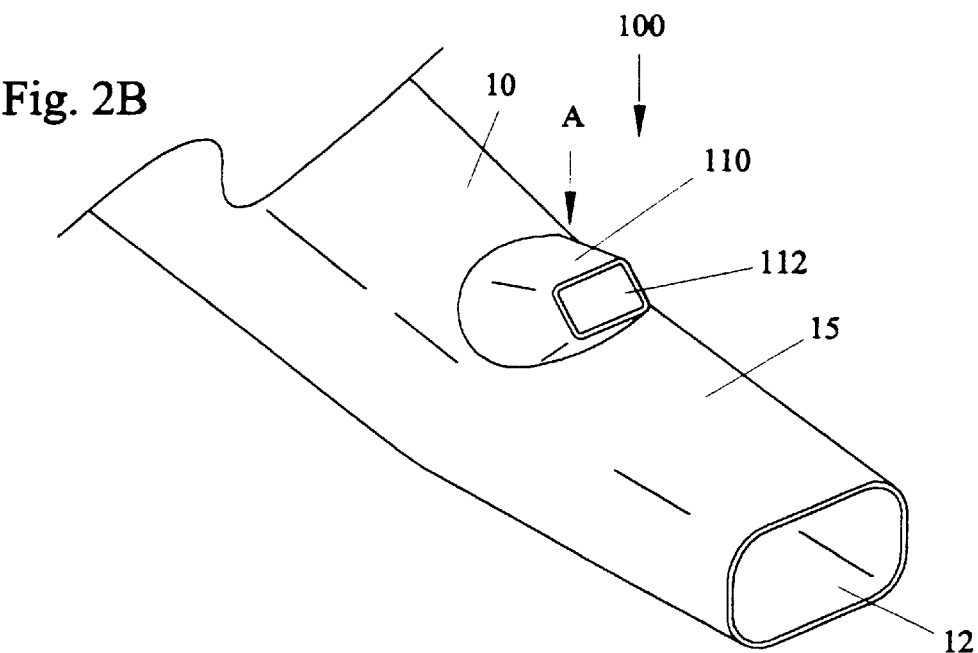
FIG. 2B is a perspective view of the nozzle portion of the embodiment of FIG. 2A.
Figure 2C:
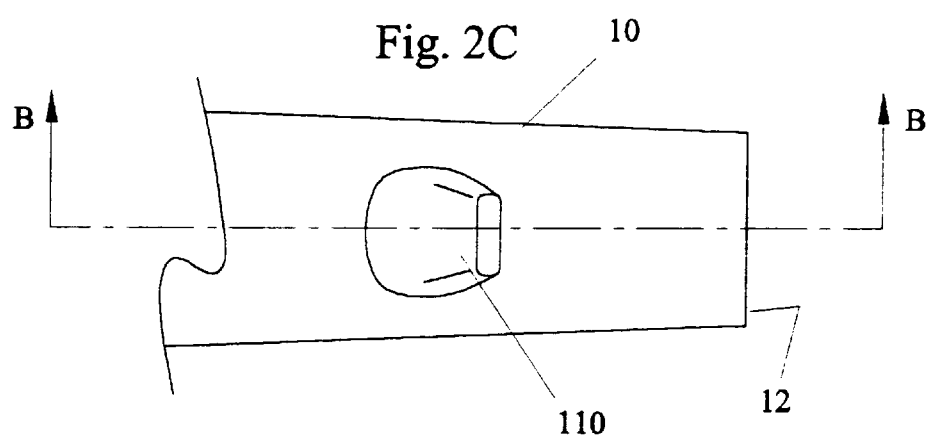
FIG. 2C is a top view of the nozzle portion of the embodiment of FIG. 2A along arrow A.
Figure 2D:
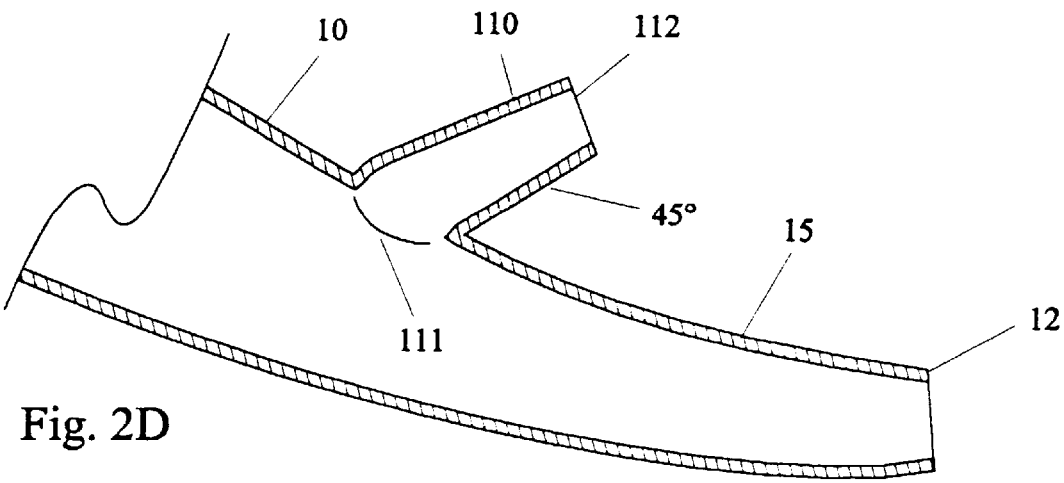
FIG. 2D is a cross-sectional view of the nozzle portion of FIG. 2C along arrow B.

FIG. 2B is a perspective view of the nozzle portion 100 of the embodiment of FIG. 2A. FIG. 2C is a top view of the nozzle portion 100 of the embodiment of FIG. 2A along arrow A. FIG. 2D is a cross-sectional view of the nozzle portion 100 of FIG. 2C along arrow B. Referring to FIGS. 2A–2D, nozzle portion 100 includes the primary nozzle portion 10 with slight upward bend 15 having a main exhaust end opening 12, and on the top surface a smaller slightly upwardly angled second tubular nozzle 110 having a narrower smaller second opening 112. Second nozzle 110 can be angled at approximately 45 degrees from the surface of the main nozzle 10. The second nozzle 110 can be located behind the flattening bend 15 that is near the exhaust end 12 of the main nozzle 10. Main nozzle 10 can be approximately 10 to approximately 16 inches long and have an exhaust and end opening 12 of approximately 2.5 inches by 1 inch. Second nozzle 110 can be approximately 2 inches long with an end opening 112 can of approximately 1.5 inches by approximately 0.5 inches. The second nozzle 110 can be located approximately 5 inches in front of main nozzle end 12

Figure 3:
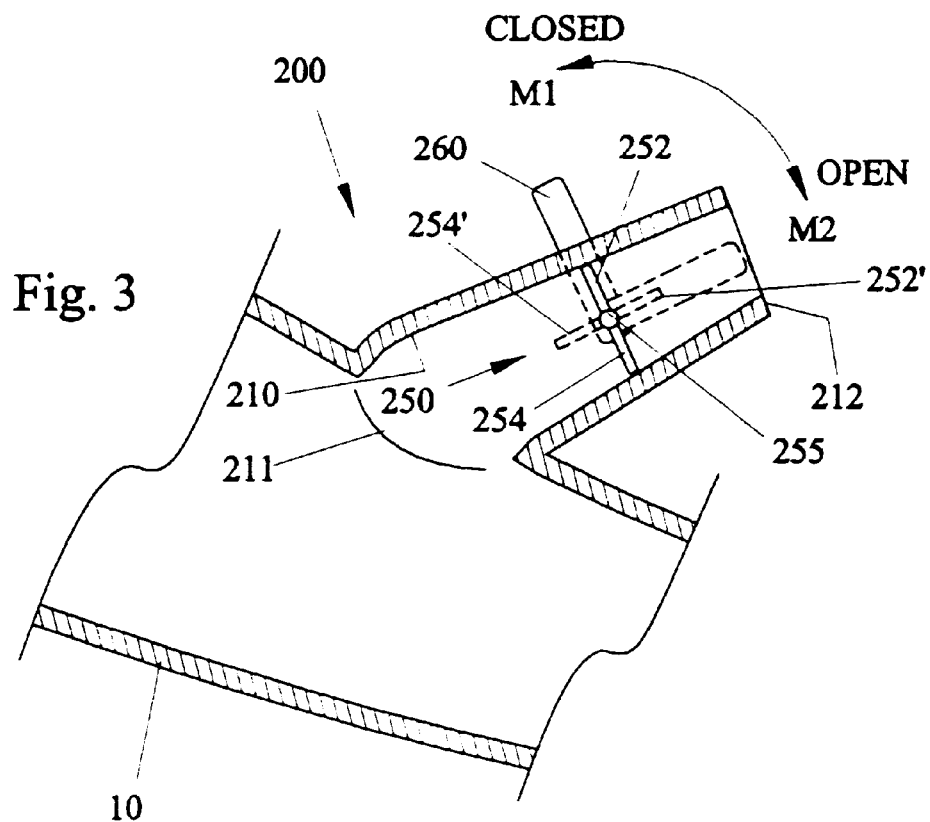
FIG. 3 is a cross-sectional view of a second embodiment of the nozzle portion with an open and shut valve.

FIG. 3 is a cross-sectional view 200 of a second embodiment of the nozzle portion with an open and shut flap valve 250. Second nozzle 210 has an interior open end 211 and an exterior end 212 similar to the like components of the previous embodiment. A flap valve 250 has an upper semi-circular half 252 and a lower semi-circular half 254 which connect to opposite sides of a rotating pin 255 having ends in the sides of the second nozzle 210. A switch 260 connected to an exterior side of second nozzle 210 connects to rotatable pin 255 so that moving the switch 260 in the direction of arrow M1 obstructs air flow through the second nozzle 210. Moving switch 260 in the direction of arrow M2 moves the flap valve to positions 252', 254' so that airflow passes through second nozzle 210. Alternatively, the switch 260 can have preselected positions so that flap valve 250 can regulate the amount of airflow depending upon the position of switch 260 between positions M1 and M2.

Figure 4:
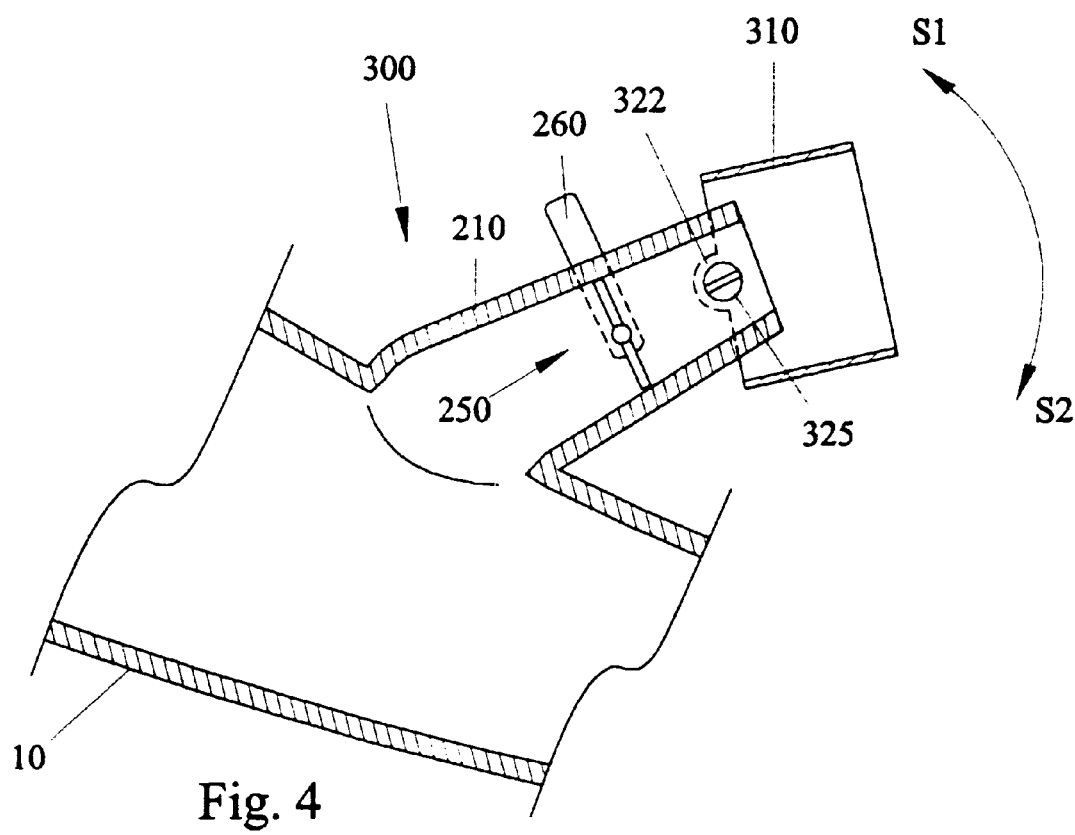
FIG. 4 is a cross-sectional view of a third embodiment of the nozzle portion with an adjustable direction attachment.

FIG. 4 is a cross-sectional view of a third embodiment 300 of the nozzle portion with an adjustable direction attachment tubular hollow extension member 310. The tubular hollow extension member 310 connects to the exhaust end 212 of second nozzle 210 by tabs 322 and screw type fasteners 325. Extension member 310 can swivel in the direction of arrow S1 and S2 to direct the airflow out from second nozzle 210.

FIG. 5A is a perspective view of a fourth embodiment 400 of the nozzle portion with the slidable second nozzle 410. FIG. 5B is a top view of FIG. 5A along arrow D. FIG. 5C is a cross-sectional side view of the second nozzle 410 of FIG. 5B along arrow C. FIG. 5D is a front view of the second nozzle 410 of FIG. 5C along arrow E.

Referring to FIGS. 5A–5D, slidable second nozzle 410 is held to the top of main nozzle 10 by side tracks 412, 414. A flat planar side 420 has a raised tab switch 460 at one end and an upwardly angled exhaust side 430 approximately 45 degrees to planar side 420. Exhaust side 430 has vertical sidewalls 432, and an open end 431. An opening 411 in the top of main nozzle 10 allows airflow to exhaust through second nozzle 410 when tab switch 460 is moved to the position of arrow R2. Moving tab switch 460 in the direction of arrow R2 allows slidable nozzle to move within tracks 412, 414 so that flat planar side 420 closes off opening 411 stopping airflow therethrough. Alternatively, the tab switch 460 can be positioned between positions R1 and R2 to regulate the amount of airflow.

Figure 6A:
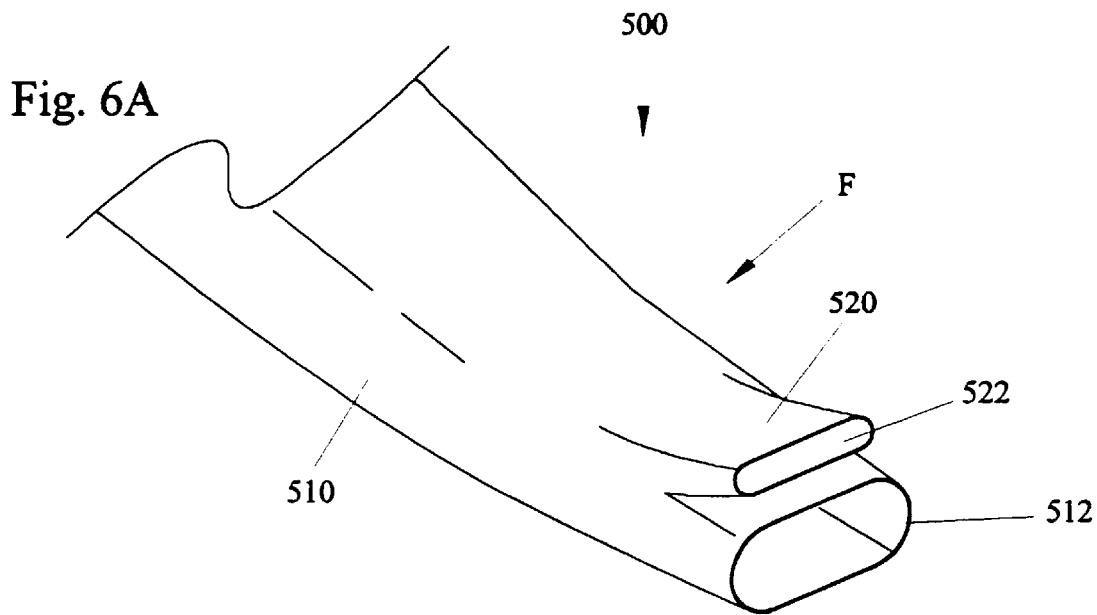
FIG. 6A is a perspective view of a fifth embodiment with dual nozzles adjacent to one another.
Figure 6B:
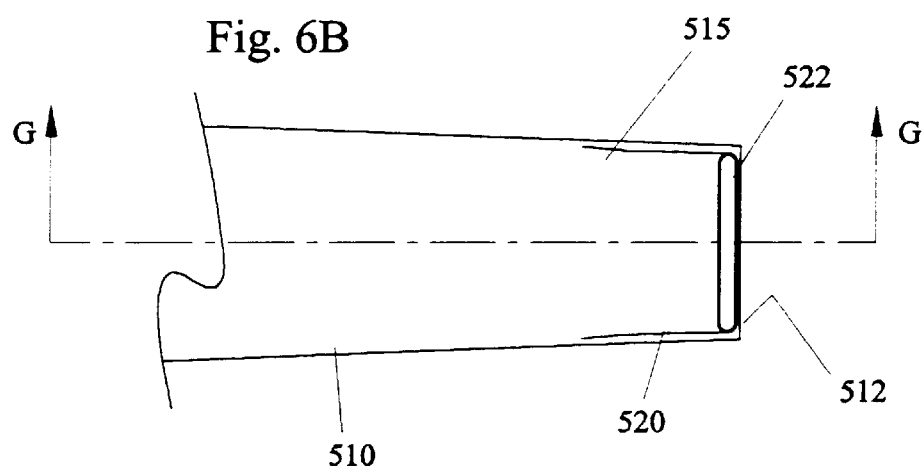
FIG. 6B is a top view of the fifth embodiment of FIG. 6A along arrow F.
Figure 6C:
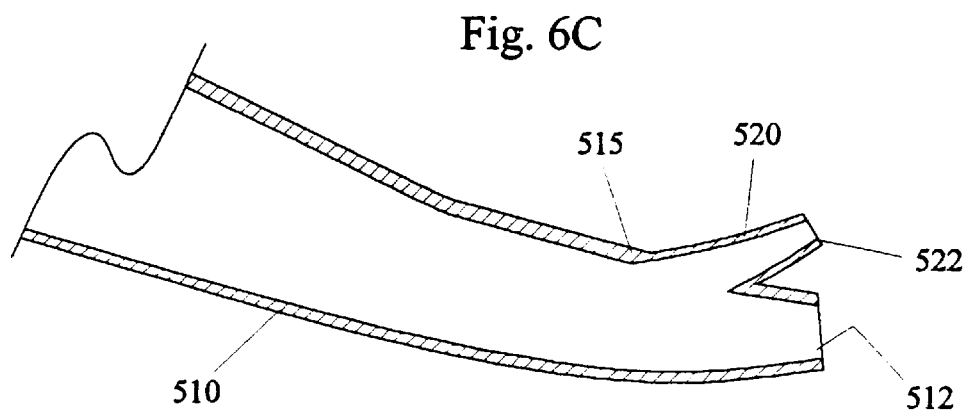
FIG. 6C is a cross-sectional side view of the embodiment of FIG. 6B along arrow G.

FIG. 6A is a perspective view of a fifth embodiment 500 with dual nozzle outlets 512, 522 adjacent to one another. FIG. 6B is a top view of the fifth embodiment 500 of FIG. 6A along arrow F. FIG. 6C is a cross-sectional side view of the embodiment 500 of FIG. 6B along arrow G. Referring to FIGS. 6A–6C, embodiment 500 includes main nozzle 510 bend 515, and oblong outlet end 512 which correspond in size to like components in FIG. 2A–2B. Second nozzle 520 has nozzle outlet 522 having a similar oblong opening to that of outlet 512, and can be sized within approximately ¼ to ⅔ the size of nozzle outlet 512. Nozzle 520 can be angled approximately 45 degrees in an upward direction from nozzle outlet 512, wherein nozzle outlets 522, 512 is substantially positioned above nozzle outlet 512.

Figure 7A:
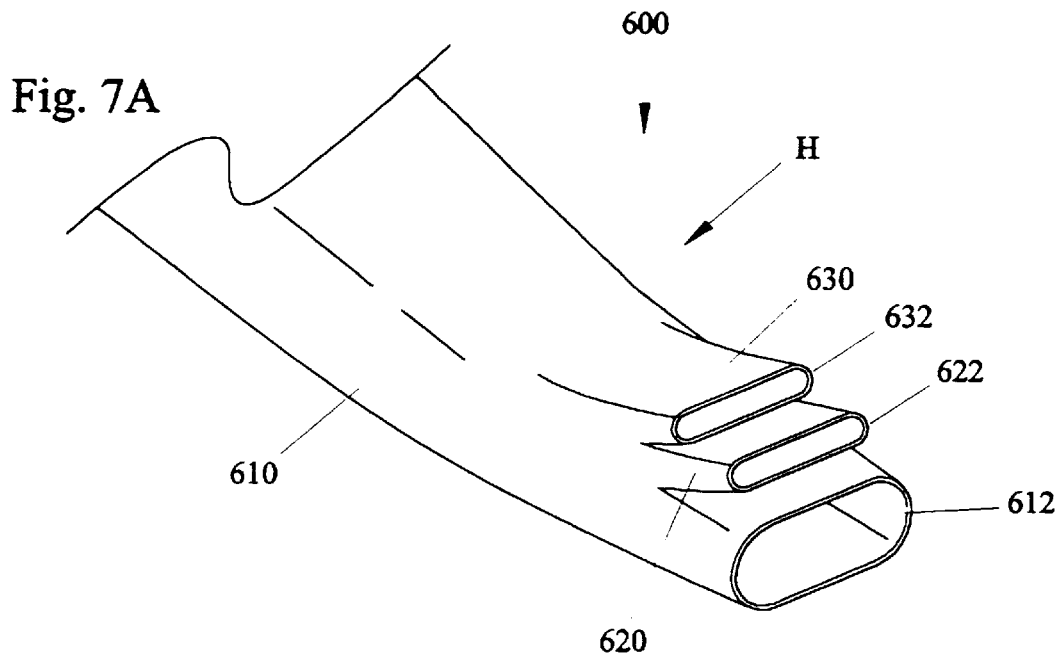
FIG. 7A is a perspective view of a sixth embodiment with triple nozzles.
Figure 7B:
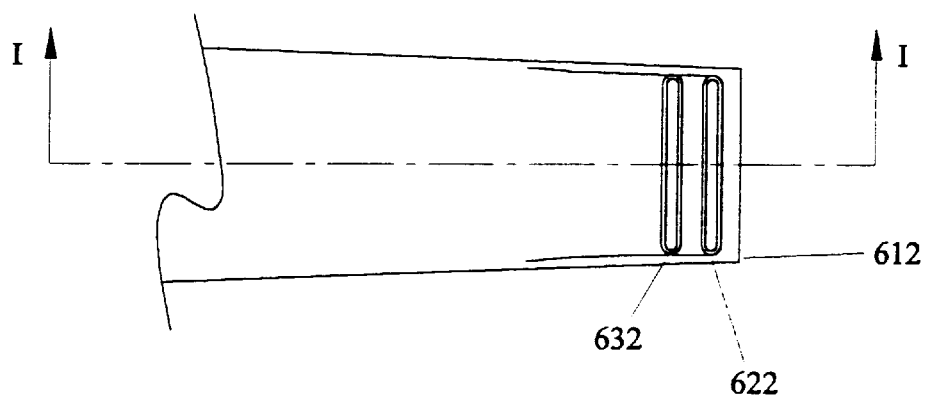
FIG. 7B is a top view of the sixth embodiment of FIG. 7A along arrow H.
Figure 7C:
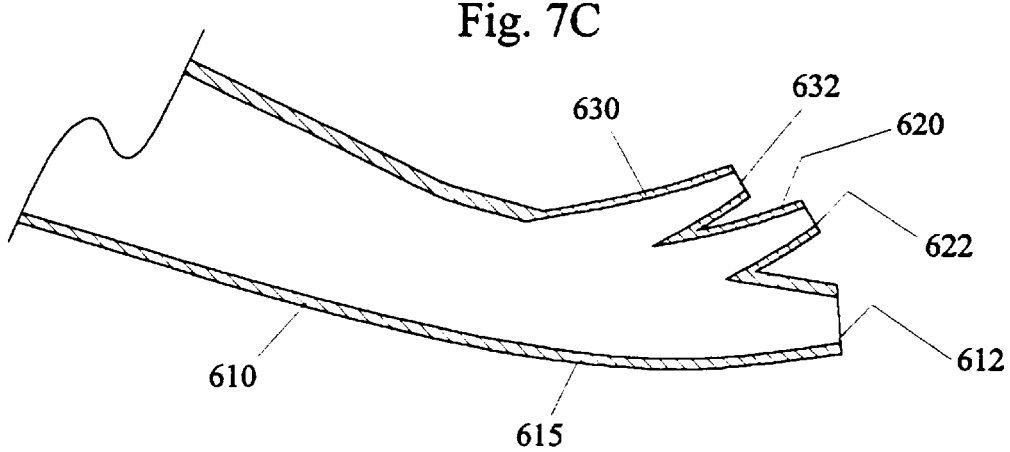
FIG. 7C is a cross-sectional side view of the embodiment of FIG. 7B along arrow I.

FIG. 7A is a perspective view of a sixth embodiment 600 with triple nozzles 610, 620, 630. FIG. 7B is a top view of the sixth embodiment 600 of FIG. 7A along arrow H. FIG. 7C is a cross-sectional side view of the embodiment 600 of FIG. 7B along arrow I. Referring to FIGS. 7A–7C, embodiment 600 includes main nozzle 610 bend 615, and oblong outlet 612 which correspond in size to like components in FIG. 2A–2B. Second nozzle 620 has an outlet 622 having a similar oblong opening to that of outlet 612, and can be sized within approximately ¼ to ⅔ the size of outlet 612. Nozzle 620 can be angled approximately 10 to approximately 45 degrees in an upward direction from outlet 622, wherein opening 612 is substantially positioned above and slightly behind outlet 612. Third nozzle 630 has an outlet 632 with a similar opening shape to that of outlet openings 612, 622. Nozzle 630 can be angled approximately 15 to approximately 70 degrees in an upward direction from outlet 632 so that opening 612 is substantially positioned above and behind outlet 612, and 622. Outlet 632 is sized to be smaller than outlet 622.

The materials for the embodiments can be formed from the same materials in the primary nozzle on the powered blower, such as but not limited to hardened plastic, molded plastic, fiberglass, composites, aluminum, metal, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A nozzle apparatus for a lawn and yard powered air blower for moving debris above and beyond obstructions, comprising:

a motor for moving an airflow;

a first longitudinal nozzle having an exhaust end for passing a first portion of the airflow in a first direction outside the exhaust end; and a second nozzle having a second exhaust end for passing a second portion of the airflow in a second direction outside the second exhaust end, the first direction being different from the second direction, wherein combining the first portion and the second portion of the airflow causes debris to move around an obstruction in the flow path of the first longitudinal nozzle.

2. The nozzle apparatus of claim 1, wherein the motor is chosen from one of:

gas powered and electric powered.

3. The nozzle apparatus of claim 1, wherein the second nozzle includes:

a slightly upwardly angled housing.

4. The nozzle apparatus of claim 3, wherein the upwardly angled housing includes:

an angle of approximately 45 degrees to first longitudinal nozzle.

5. The nozzle apparatus of claim 1, wherein the second nozzle includes:

a shut-off valve having a first position for allowing air to pass through the second nozzle and a second position for closing airflow through the second nozzle.

6. The nozzle apparatus of claim 1, wherein the second nozzle includes:

an adjustable shut-off valve having a first position for allowing air to pass through the second nozzle and a second position for closing airflow through the second nozzle, wherein moving the valve between the first and the second position adjusts and regulates the amount of air passing out the second nozzle.

7. The nozzle apparatus of claim 1, wherein the second nozzle includes:

a directional member connected to the second exhaust end of the second nozzle, the directional member being movable so that airflow from the second nozzle can pass in plural directions therefrom.

8. The nozzle apparatus of claim 1, wherein the second nozzle includes:

an adjustable sliding member having a first position for allowing air to pass through the second nozzle and a second position for closing airflow through the second nozzle.

9. The nozzle apparatus of claim 1, wherein the second nozzle includes:

a sliding member having a first position for allowing air to pass through the second nozzle and a second position for closing airflow through the second nozzle, wherein moving the valve between the first and the second position adjusts and regulates the amount of air passing out the second nozzle.

10. The nozzle apparatus of claim 1, wherein the second exhaust end of the second nozzle is located approximately five inches behind the first exhaust end of the first nozzle.

11. The nozzle apparatus of claim 1, wherein the second exhaust end of the second nozzle is located adjacent to and within five inches behind the first exhaust end of the first nozzle.

12. The nozzle apparatus of claim 1, wherein the second exhaust end of the second nozzle includes:

an opening smaller than the exhaust end of the first nozzle.

13. The nozzle apparatus of claim 1, further comprising:

a third nozzle positioned above and behind the second nozzle.

14. The nozzle apparatus of claim 13, wherein the third nozzle further includes:

an opening smaller than both the exhaust end and the second exhaust end.

15. A nozzle apparatus for a lawn and yard powered air blower for moving debris above and beyond obstructions, comprising:

a motor for moving an airflow;

a first longitudinal nozzle having an exhaust end for passing a first portion of the airflow in a first direction outside the exhaust end;

a second nozzle having a second exhaust end for passing a second portion of the airflow in a second direction outside the second exhaust end, the first direction being different from the second direction;

a shut-off valve having a first position for allowing air to pass through the second nozzle and a second position for closing airflow through the second nozzle; and an extension member connected to the second exhaust end of the second nozzle, the extension member being movable so that airflow from the second nozzle can pass in plural directions therefrom, wherein combining the first portion and the second portion of the airflow causes debris to move upward and over an obstruction in the flow path of the first longitudinal nozzle.

16. The nozzle apparatus of claim 15, further comprising:

a third nozzle positioned above and behind the second nozzle.

17. The nozzle apparatus of claim 16, wherein the third nozzle further includes:

an opening smaller than both the first exhaust end and the second exhaust end.

18. A device for moving debris about obstacles using an air blower, comprising:

a chamber having an outlet;

means for pressurizing air inside the chamber to the outlet; and means connected to the outlet for forming a swirling airflow from the pressurized air so that debris in front of the outlet is moved around an obstacle located behind the debris, the swirling airflow means further includes:

first means for directing a first portion of the pressurized air into a first direction; and second means for directing a second portion of the pressurized air into a second direction, the second direction being off-axis to the first direction.

* * * * *